United States Patent Office 3,323,811
Patented June 6, 1967

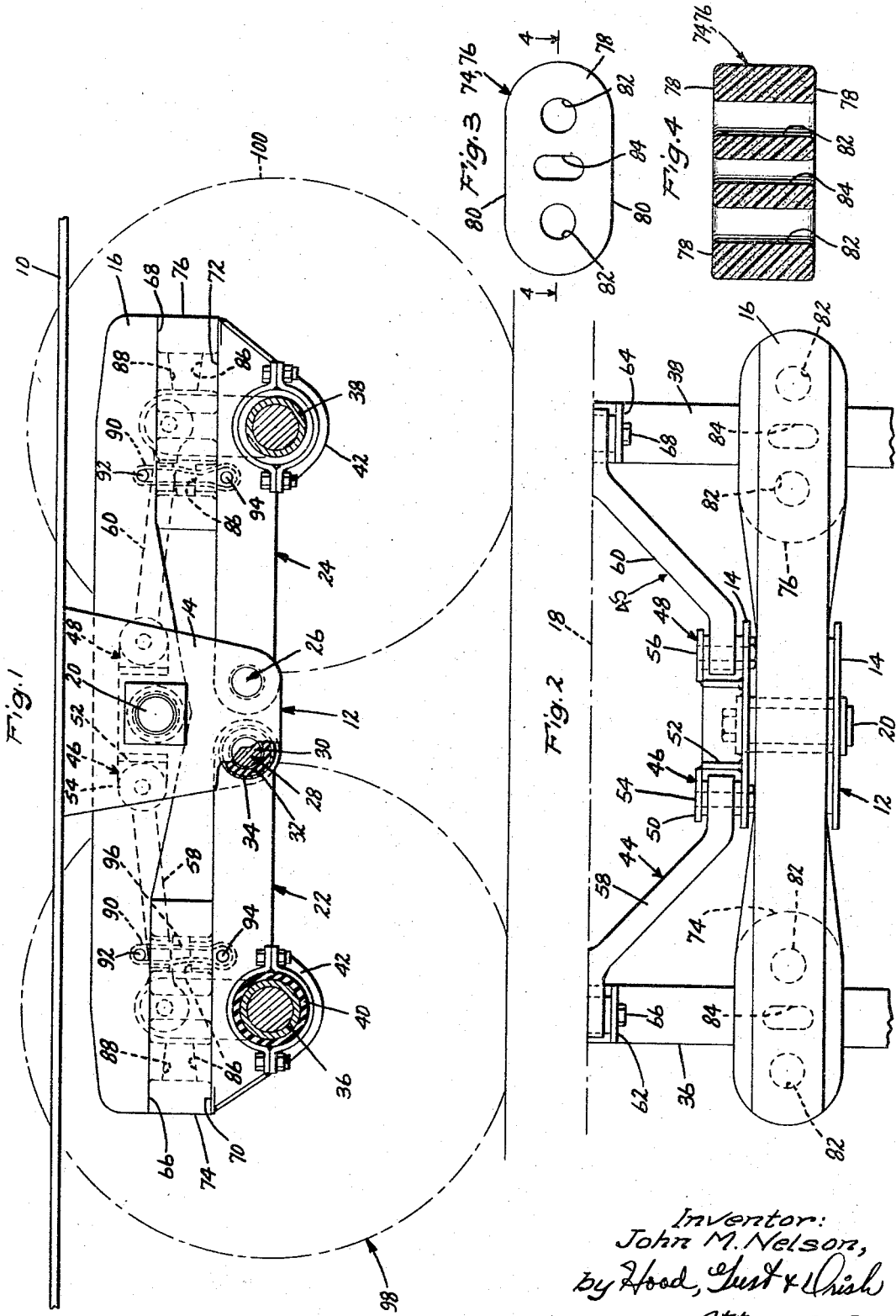

3,323,811
SUSPENSION FOR VEHICLES
John M. Nelson, R.F.D. 2, Ottawa, Ohio 45875
Filed Jan. 12, 1965, Ser. No. 424,957
5 Claims. (Cl. 280—104.5)

The present invention relates to a suspension for vehicles, and more particularly to a novel and improved suspension utilizing a blown or expanded urethane material which is both deformable and compressible in providing for the usual relative motion between vehicle frames and axles which occurs during the use of the vehicle.

In plural wheel suspensions for the heavier, load-carrying vehicles, it is necessary or desirable that the load of the vehicle be distributed as uniformly as possible over all the wheels. As a corollary, it is also either necessary or desirable to equalize load changes, resulting from encountering irregular road surfaces and the like, among all of the wheels, and, to this end, many different designs and configurations in suspension systems have been proposed. These systems have included mechanical and air equalizers so arranged as to transfer load between wheels as uniformly as possible.

Such prior systems have, in some instances, been unduly complex, have lacked adequate wear-life, have required substantial maintenance, and have been quite expensive. Also, the spring rate of prior systems, especially the systems using metallic springs, has been severely limited. It is, therefore, an object of this invention to provide a suspension system for such load-carrying vehicles which is simple, inexpensive, durable, does not require as much maintenance and attention as prior systems and provides greater spring rates without increasing the complexity of design.

It is another object of this invention to provide a tandem suspension for vehicles which utilizes in a novel combination a blown urethane material to provide the resilience and spring rate needed in the suspension.

Still another object of this invention is to provide an improved vehicle suspension system wherein an expanded or blown urethane polymer having predetermined resilient and load-supporting characteristics is used for providing relative motion between the vehicle frame and the axles.

Other objects will become apparent as the description proceeds.

In the accomplishment of the above objects, there is provided in one form of the invention a tandem suspension for vehicles comprising a vehicle frame having a longitudinal axis, two hanger devices fixedly secured to the frame and depending therefrom, said hanger devices being aligned transversely of the frame, two walking beams pivotally mounted intermediate the ends thereof on said hanger devices, respectively, for vertical swinging movement about a horizontal axis, said beams extending parallel to the longitudinal axis of said frame, four radius arms arranged in two pairs pivotally mounted on said two hanger devices, respectively, the arms of each pair having one end thereof pivotally mounted on the respective hanger device for vertical swinging movement about horizontal axes parallel to the first-mentioned axis, said axes being horizontally spaced on opposite sides of the vertical line passing through the pivot axis of the respective walking beam, the last-named arms extending oppositely in longitudinal alignment from the hanger device and parallel to the respective walking beam whereby one arm extends forwardly and the other arm extends rearwardly, each pair of arms being disposed beneath and spaced from the respective walking beam, said walking beams and the respective arms having substantially flat facing surfaces; the two pairs of arms being aligned transversely of said frame, a rear axle mounted on the rear ends of the two rear arms, a front axle mounted on the front end of the front arms, four bodies of resilient deformable and compressible microcellular material interposed between said walking beams and the respective radius arms, two of said bodies being disposed between the front ends of said radius arms and the front ends of the respective walking beams in load-bearing relation, the remaining two of said bodies being disposed between the rear ends of said radius arms and the rear ends of the respective walking beams in load-bearing relation, rebound means interconnecting the opposite ends of the walking beams to the front and rear ends of the respective arms for limiting separation movement therebetween, means for resisting braking and drive torque and for controlling relative lateral movement between said axles and said frame; the material of said bodies being a blown urethane material of a density of about fifteen to thirty pounds per cubic foot, said material including a multiplicity of microminiature compressible cells which renders the body resiliently compressible, each said body having a thickness between the respective walking beam and radius arm which supports a predetermined load that partially but not fully compresses said cells thereby providing cells capable of further compression for resiliently supporting a load in addition to said predetermined load; each said body having spaced-apart, parallel upper and lower surfaces in engagement with facing surfaces, respectively, of said walking beam and radius arm, each body having at least one hole therethrough which extends between said upper and lower surfaces, each said radius arm having an upwardly projecting overload member which fits and projects into the hole of the respective body; each walking beam having on each end thereof a depending overload member which fits and projects into the hole of the respective body, the overload members in each hole being normally spaced apart a predetermined distance and engageable when the respective body is compressed by a pre-determined amount.

The above-mentioned and other features and objects of this invention and the manner of attaining them will become more apparent and the invention itself will be best understood by reference to the following description of an embodiment of the invention taken in conjunction with the accompanying drawings, which are drawn to scale, wherein:

FIG. 1 is a side elevation, partly sectioned, of one embodiment of this invention;

FIG. 2 is a top plan view of one-half of the assembly of FIG. 1;

FIG. 3 is a top plan view of a body of polymer foam material used in the assembly of the two preceding figures; and FIG. 4 is a sectional view of the same body taken substantially along the section line 4—4 of FIG. 3.

Referring to the drawings, a conventional, rigid and suitably strong vehicle frame is indicated by the numeral 10. Rigidly secured to and depending from said frame on opposite sides of the vehicle are hanger devices, indicated generally by the numeral 12. As shown in both FIGS. 1 and 2, each hanger device 12 comprises two steel or the like depending plates 14 which are spaced apart and parallel and secured to the underside of the frame 10 in some suitable manner such as by welding.

A suitably strong rocker arm or walking beam 16 is positioned between each pair of plates 14 in substantial parallelism therewith, the walking beam normally extending horizontally in parallelism with the longitudinal axis 18 of the vehicle frame. This walking beam 16 is pivotally mounted on the two plates 14 by means of a suitably strong pin assembly 20, this pin assembly 20 providing a horizontal axis about which the walking beam 16 may swing vertically. As shown more clearly in FIG. 1, the pin assembly 20 is disposed in the central portion of the plates 14 and sufficiently below the vehicle frame 10 so as to permit the beam 16 to swing the required distance without contacting the frame.

The suspension system also includes four radius arms, two of these being shown in the drawings and indicated generally by the numerals 22 and 24. These radius arms are suitably strong and rigid and are pivotally mounted by means of rubber bushed assemblies on the lower end of the hanger device 12 between the two plates 14 as shown. The radius arm 24 normally extends rearwardly of the vehicle in parallelism with the walking beam 16 as shown in FIG. 1 of the drawings. Also, the arm 24 is disposed beneath and spaced from the aft portion of the beam 16. The forward end of the arm 24 is pivotally mounted on the hanger device 12 by means of a rubber bushed assembly indicated generally by reference numeral 26 such that the arm 24 is free to swing vertically and to a limited extent universally as determined by the rubber bushing in the pivot assembly 26.

The arm 22 which may be identical to the arm 24 extends oppositely and forwardly of the hanger device 12 in substantial horizontal alignment with the arm 24. Also, the arm 22 lies beneath and is spaced from the front portion of the beam 16 as shown. A rubber bushed pivot assembly 28 pivotally mounts the arm 22 on the hanger device 12 as shown, the two assemblies 26 and 28 preferably being identical. A description of the assembly 28, therefore, will suffice for the assembly 26. This assembly 28 includes a steel or the like pivot pin 30 secured at the opposite ends thereof to the two plates 14 and is surrounded by a suitable rubber bushing 32 which fits inside a steel or the like sleeve 34. This sleeve 34 is welded or otherwise secured to a suitable bore in the aft end of the arm 22 such that the rubber bushing 32 is interposed between the pivot pin 30 and the arm 22. Enough spacing is provided between both arms 22 and 24 and the respective plates 14 to accommodate some tilting and lateral movement as would normally be required in a tandem suspension for normal operation.

In this tandem suspension, two axles are provided, the front axle 36 being suitably secured to the front ends of the arms 22 and a rear axle 38 being likewise suitably secured to the rear ends of the arms 24. It should be noted that only one-half of the total suspension is shown in FIG. 2, the axis 18 constituting a longitudinal dividing line between the two halves of the suspension. The half of the suspension not shown is a duplicate of that of FIG. 2, these two halves being allochirally joined at the dividing line indicated by the line 18. Thus, the total suspension will have two walking beams 16, two hanger devices 12 and four radius arms 22, 24. This provides a tandem suspension for four wheels, two wheels being on each side of the vehicle as is conventional.

The axles 36 and 38 are secured to the respective arms by means of rubber bushing assemblies in which a sleeve-like bushing 40 surrounds the axle and is interposed between the axle proper and a clamping device indicated by the numeral 42 on the respective arm 22, 24. If the wheels are not to be driven, the axle itself may be stationary; however, if the wheels are to be driven, then conventional housing (not shown) for the axles are used with the rubber bushings being disposed between the housings and the radius arms. These bushings 40 are so arranged as to permit some relative movement between the axles or housings and the radius arms to accommodate tilting of the vehicle.

Means are provided in the total assembly for resisting brake torque and for preventing the axles from shifting laterally. This means includes two wishbone-shaped torque elements, indicated generally by the numerals 44 and 45, these elements each having two arms each, one arm of element 44 being indicated by numeral 58 and one arm of element 45 being indicated by numeral 60. The arms are identically constructed, such that the description of one will suffice for all. As more clearly shown in FIG. 2, suitable, horizontally spaced brackets 46 and 48 are rigidly secured to the inside plate 14, each bracket consisting of a flat plate or lug-shaped member 50 spaced from and parallel to the plate 14, which is secured in position by another plate 52 outstanding from the plate 14 and welded at its opposite ends to this plate 14 and also the member 50.

Conventional, rubber-bushed pivot pins 54 and 56 horizontally extend between the plates of the respective brackets 46 and 48 as shown, and are suitably secured at the opposite ends thereof to provide a resilient, pivotal mounting. The front torque arm 58 which is a solid, suitably strong steel member is pivotally mounted on the pin 54 and is held against horizontal movement on the pin by some suitable means such as washers or the like.

The rear torque arm 60 is identically mounted on its pin 56.

Upstanding from both of the axles 36 and 38 are suitably long torque lugs 62 and 64, respectively, which are welded or otherwise suitably secured to the axles or housings, as the case may be. The front and rear ends of the torque arms 58 and 60, respectively (or in other words the apices of the wishbones 44 and 45), are pivotally secured to the lugs 62 and 64, respectively, by means of horizontal, rubber-bushed pivot pins 66 and 68 as shown. Also, the axle ends of these torque arms 58 and 60 are held against lateral movement with respect to the lugs and axles by some suitable means such as shoulders or washers between the lugs and the ends of the torque arms. Thus mounted, the torque arms are free to swing relatively vertically with respect to the axles and vehicle frame but not laterally. As shown, the torque arms angle inwardly such that the front torque arms of the total 4-wheel suspension resemble a wishbone as do the two rear torque arms. By means of this configuration, lateral shifting of the axles relative to the vehicle body is resisted or prevented, and braking torque is transmitted from the wheels directly to the frame. Tilting of the vehicle frame relative to the axles is accommodated by the rubber bushings provided between the pivot pins 54, 56, 66 and 68 and the respective arm ends.

The undersides of the front and rear ends of the walking beams are provided with flat surfaces 66 and 68, respectively, and the upper sides of the arms 22 and 24 are also provided with flat horizontal surfaces 70 and 72, respectively, in parallelism therewith. Received between these respective flat surfaces are two bodies 74 and 76, as shown in FIGS. 1 and 2, of blown urethane material which has resilient and load-bearing qualities. These bodies are shown in detail in FIGS. 3 and 4 as being substantially rectangular in shape with the exception of the opposite ends which are part-cylindrical. The upper and lower surfaces 78 thereof are flat and parallel so as to fit between the respective surfaces on the walking beam and radius arms, and the sides 80 are also flat and parallel as shown. Two parallel, spaced-part circular holes or bores are provided through the end portions of the bodies as shown and are substantially parallel. A slot or elliptically shaped bore 84 is also provided therethrough midway between and in substantial parallelism with the two end bores 82. The blocks 74 and 76 are identical in shape, size and material, such that a description of one will suffice for all. With the bodies fitted between the respective flat surfaces on the walking beam and radius arms as shown in FIG. 1, upstanding steel projections 86 on the front and rear ends, respectively, of the two radius arms 22 and 24 fit into the respective bores 82 for a short distance as shown. These projections 86 may be considered as overload bumpers and may be formed as integral embossments on the respective arms 22, 24. These bumpers 86 preferably are of a diameter slightly larger than that of the holes 82 so as to provide a secure fit against lateral dislodgement between the bodies and the arms 22, 24.

Depending from the opposite ends of the walking beam 16 are similar projections 88 which also may be considered as overload bumpers, the facing ends of the respective overload bumpers 86 and 88 being spaced apart a distance depending upon design requirements. These bumpers 86 and 88 are designed to be engageable and to limit the movement of the arms 22, 24 toward the respective ends of the walking beams 16. Additionally, these bumpers serve to locate the respective bodies 74 and 76 as well as hold the same in the assembled position shown in FIG. 1.

Rebound devices or snubbers indicated generally by the numeral 90 are connected between the front and rear ends, respectively, of the beam 16 and the adjacent end portions of the front and rear arms 22 and 24. Each snubber 90 includes a pin or bolt 92 on the beam 16 and another similar pin or bolt 94 on the arm 22, 24 to which are secured a flexible cord or web made of strong nylon, steel or the like. This cord 96 may be either stretchable or may be provided with enough slack when the suspension is absolutely horizontal so as to prevent the arms from spreading too far from the respective ends of the walking beam 16. Primarily, these rebound snubbers serve the usual function of rebound devices in conventional suspensions in maintaining the various parts in assembled relation. In the present instance, the snubbers maintain the radius arms 22 and 24 in operative engagement with the respective ends of the walking beam 16, the bodies 74 and 76 of the plastic material being engageably interposed therebetween.

The bodies 74 and 76 are of a blown urethan polymer material which can be based upon either a polyalkylene ether glycol or a polyester glycol. However, as some polyester based urethanes are hydrolyzed, as indicated by the paper entitled "Water Resistance of Liquid Urethane Vulcanizates," by Robert J. Athey, Contribution No. 206, presented before the SPE Regional Technical Conference, Washington, D.C. on June 4, 1964, and therefore, in the presence of water, are reversibly plasticized or irreversibly hydrolyzed, the polyether based urethanes are preferable. The following urethanes, however, would be satisfactory for the application for this invention, if they were blown so as to have the load-bearing and compression characteristics required by this invention and the material was stable so that these characteristics could be maintained over a relatively long period of time:

*Polyethers*

Polytetramethylene ether glycol—tolylene diisocyanate
Polytetramethylene ether glycol—diphenylmethane diisocyanate
Polytetramethylene ether glycol—m-phenylene diisocyanate
Polypropylene ether glycol—tolylene diisocyanate

*Polyesters*

Polyethylene propylene adipate glycol—tolylene diisocyanate
Polyethylene propylene adipate glycol—diphenylmethane diisocyanate
Polyethylene adipate glycol—1,5 naphthalene diisocyanate These materials properly blown include a multiplicity of microminiature compressible cells, either open or closed, the closed cells being gas-tight enclosures. Each body 74 and 76 has a thickness between the walking beam and radius arm which supports a predetermined load that partially but not fully compresses the cells. Such cells are therefore capable of further compression for supporting resiliently a load in addition to the predetermined load. This predetermined load may, of course, be the empty weight of the vehicle, and the additional load that of material or products being hauled on the vehicle.

In general, the blown urethane polymer material, as aforementioned, is formed from a prepolymer made from a polyester or polyether resin. The blowing or expanding agents may be either carbon dioxide or nitrogen obtained by suitable chemical reactions during the processing of the bodies 74 and 76. Depending upon the expanding agents or chemical reactions used, the cell structure will be either open or closed or a combination of both. See, for an exemplary discussion of the blowing, and the control thereof, of a polytetramethylene ether glycol-tolylene diisocyanate urethane, a bulletin published by the E. I. du Pont de Nemours & Co. entitled "Closed Cell Sponge from Adiprene L Urethane Rubber," by Robert P. Kane, Contribution 194, November 2, 1964.

One suitable polyether based urethane elastomer, for use in this invention, is the polytetramethylene ether glycol-tolylene diisocyanate polymer as sold by E. I. du Pont de Nemours & Co. under their trademark Adiprene L–100 and L–167. This polymer having a density of about 70 pounds per cubic foot, when blown to a density of about 15 to 30 pounds per cubic foot, is suitable for the bodies 74 and 76. Both Adiprene L–100 and L–167 can be blown by both carbon dioxide and nitrogen as exemplified by the following chart, tabulating two possible formulations of Adiprene L–100, the quantities being in parts by volume:

| Compound (Body 74, 76) | A | C |
|---|---|---|
| Elastomer | Adiprene | Adiprene |
| Expanding Agent | Carbon Dioxide | Nitrogen |
| Adiprene L–100 | 100 | 100. |
| Silicone Copolymer: Surfactant.[1] | 2 | |
| Silicone Surfactant [2] | | 2. |
| Moca [3] | 9.7 | 12. |
| Triethylenediamine [4] | 0.2 | |
| Water | 0.2 | |
| Finely divided silica | | 5. |
| Nitrosan [3] | | 3.5 |
| Adiprene temperature | 50° C | 100° C. |
| Cure time in mold | 30 min. at 100° C | 45 min. at 100° C. |
| Cure time in oven | 1 hr. at 100° C | 1 hr. at 100° C. |

[1] Dow Chemicals DC–113, General Electric's SF–1034, and Union Carbides L–520 were equivalent in this application.
[2] Dow Chemical's DC–200.
[3] E. I. du Pont de Nemours & Co.
[4] Houdry Co.'s Dabco.

In the manufacture of the closed cell material, tiny cells, microminiature in size, are formed within which gas, such as carbon dioxide, is trapped. This gas results from the chemical reactions involved in the manufacturing process. The individual cells thus may be regarded as entirely separate, hermetically sealed or gas-tight enclosures resembling inflated rubber balloons which may be compressed, deformed and the like without the gas escaping. Further information regarding the characteristics of other suitable forms of this material may be found in the bulletin dated January 21, 1964, published by the aforementioned E. I. du Pont de Nemours & Co.

In operation, as the vehicle is driven over rough ground, upon the front-most wheel 98 being raised as a consequence of rolling over an elevated bump, the axle 32 is raised as is the radius arm 22. This motion is transferred to the front end of the beam 16 by the spring body 74, causing the rear end of the beam to depress, thereby transmitting a portion of the load to the rear wheel 100 via the body 76 and the radius arm 24. The same motion happens in reverse when the rear wheel engages an elevated bump, a portion of the load imparted to the wheel 100 being transferred to the forward wheel 98. The walking beam 16 is free to swing vertically in equalizing the load between the two wheels 98 and 100, and the two radius arms 22 and 24 swing or move correspondingly. It will be noticed that the geometry of the suspension as viewed in FIG. 1 permits substantially parallel movement of the radius arms 22 and 24 with respect to the beam 16.

The bodies 74 and 76 being resiliently compressible and deformable, relative movement between the wheels and axles and the body is accommodated by the spring action thereof. Sudden, upward movement of, for example, the wheel 98 will result in volumetric compression of the body 74 in which the two surfaces 66 and 70 of the beam and radius arm 22, respectively, move closer together against the resilient force of the body 74 tending to spread the same apart. Because of the compressibility of the microminiature cells inside the body 74, the latter actually compresses and reduces in volume each individual cell accommodating this. In the closed cell structure, the increased pressure built up in each cell exerts a force tending to restore the body 74 to its original shape.

In the open cell structure, the portions of the body between cells resemble spring elements which when deformed exert a restoratative force resisting resiliently the deformation. These phenomena result in the body 74 acting as a spring capable of absorbing road shock and supporting heavy loads. If the load applied to the vehicle is too great, the overload bumpers 86 and 88 will engage, thereby preventing the body 74 from being squeezed flat or the surfaces 66 and 70 of the walking beam and radius arms from directly engaging.

Any relative movement between the walking beam 16 and the radius arms tending to spread the same apart is prevented by reason of the rebound snubbers 90.

If in being driven over rough ground the wheels on opposite sides of the vehicle are raised and lowered unequally, there is a tilting movement of the axles which is accommodated by the various rubber bushings between the axles and the radius arms as well as those between the radius arms and the hanger devices 12. Any relative tilting movement, however slight, between the radius arms 22, 24 and the walking beam 16 likewise is fully accommodated by the plastic bodies 74 and 76 inasmuch as the latter not only are compressible but are also deformable.

Improved operation is realized in the distribution and equalization of forces and load among the various wheels, a part of this being directly attributable to the relatively large size of the bodies 74, 76 and the large supporting areas thereof. In distinct contrast with helical coil springs, the bodies 74 and 76 cover a substantial area of the respective radius arm and walking beam such that the spring action is distributed over a relatively large portion thereof to provide for a softer, smoother ride as well as efficient absorption of road shock and load. The total suspension is rendered more durable because of the relatively large areas of distribution of the spring forces which reduces fatigue in localized portions of the radius arms and walking beams. Additionally, since the plastic bodies are indeed compressible, as contrasted with rubber which is not compressible, direct, vertical spring action is made available without requiring peripheral spaces for the plastic bodies to deform into. It is well known that rubber, as such, is relatively incompressible such that when it is used as a spring or shock absorber, space must be provided for the rubber to deform or distort into, otherwise no spring action can be obtained. The present invention does not require such expansion space inasmuch as the plastic bodies are not only deformable, but they are also compressible, thereby providing a spring action which requires no more physical space than the size of the bodies themselves in uncompressed form.

Repetitive flexing of the body 74, 76 generates heat internally thereof which does not quickly dissipate because of the thermal insulating properties of the material. The holes 82 and 84 are therefore located such and made to such sizes as to facilitate thermal dissipation and at the same time permit the body to be of a sufficient size and shape to support the desired load and provide the desired deflection characteristic.

This invention permits achievement of almost any deflection characteristic desired by providing the bodies 74, 76 in particular, geometric shapes. Such shapes include frustums, cubes, cylinders, paraboloids and the like. A frustum of a cone, for example, interposed between the walking beam 16 and arm 24 with the base thereof on the arm 24 will possess an initial deflection under load which is greater than the subsequent deflection under greater load. Other shapes obviously provide different deflection characteristics.

In an operating embodiment of this invention, typical dimensions of the various parts are as follows; however, these dimensions are given by way of example only and are not to be considered as limitations:

| | | |
|---|---|---|
| Over-all length of walking beam 16 | inches | 68 |
| Over-all length of radius arm 22, 24 | do | 33½ |
| Thickness of body 74, 76 (free height) | do | 8½ |
| Length of body 74, 76 | do | 18 |
| Width of body 74, 76 | do | 9 |
| Density of body 74, 76, Compound C | lbs./cu. ft | 22 |
| Volume of body 74, 76 | cu. ft | 0.67 |

In other respects, dimensions may be scaled directly from FIGS. 1 and 2 of the drawings.

While there have been described above the principles of this invention in connection with specific apparatus, it is to be clearly understood that this description is made only by way of example and not as a limitation to the scope of the invention.

What is claimed is:

1. A tandem suspension for vehicles comprising a vehicle frame having a longitudinal axis, two hanger devices fixedly secured to said frame and depending therefrom, said hanger devices being aligned transversely of said frame, two walking beams pivotally mounted intermediate the ends thereof on said hanger devices, respectively, for vertical swinging movement about a horizontal axis, said beams extending parallel to the longitudinal axis of said frame, four radius arms arranged in two pairs pivotally mounted on said two hanger devices, respectively, the arms of each pair having one end thereof pivotally mounted on the respective hanger device for vertical swinging movement about horizontal axes parallel to the first-mentioned axis, said axes being horizontally spaced on opposite sides of a vertical line passing through the pivot axis of the respective walking beam, the last-named arms extending oppositely in longitudinal alignment from the hanger device and parallel to the respective walking beam whereby one arm extends forwardly and the other arm extends rearwardly, each pair of arms being disposed beneath and spaced from the respective walking beam, said walking beams and the respective arms having substantially flat facing surfaces; the two pairs of arms being aligned transversely of said frame, a rear axle mounted on the rear ends of the two rear arms, a front axle mounted on the front ends of said front arms, four bodies of resilient deformable and compressible microcellular material interposed between said walking beams and the respective radius arms, two of said bodies being disposed between the front ends of said radius arms and the front ends of the respective walking beams in load-bearing relation, the remaining two of said bodies being disposed between the rear ends of said radius arms and the rear ends of the respective walking beams in load-bearing relation, rebound means interconnecting the opposite ends of the walking beams to the front and rear ends of the respective arms for limiting separation movement therebetween, means associated with said hanger devices and axles for resisting braking and drive torque and for controlling relative lateral movement between said axles and said frame; the material of said resilient bodies being a blown urethane elastomer of a density of about fifteen to thirty pounds per cubic foot, said material including a multiplicity of microminiature compressible cells of gas which render the body resiliently compressible, said cells being gas-tight enclosures, each said body having a thickness between the respective walking beam and radius arm which supports a predetermined load that partially but not fully compresses said cells thereby providing cells capable of further compression for supporting resiliently a load in addition to said predetermined load; each said body having spaced apart parallel upper and lower surfaces in engagement with facing surfaces, respectively, of said walking beam and radius arm, each body having at least one heat-dissipating hole therethrough which extends between said upper and lower surfaces, each said radius arm having an upwardly projecting overload member which fits and projects into the hole of the respective body; each walking beam having on each end thereof a depending overload member which fits and projects into the hole of the respective body, the overload members in each hole being normally spaced apart a predetermined distance and engageable when the respective body is compressed by a predetermined amount.

2. A tandem suspension for vehicles comprising a vehicle frame having a longitudinal axis, two hanger devices fixedly secured to said frame and depending therefrom, said hanger devices being aligned transversely of said frame, two walking beams pivotally mounted intermediate the ends thereof on said hanger devices, respectively, for vertical swinging movement about a horizontal axis, said beams extending parallel to the longitudinal axis of said frame, four radius arms arranged in two pairs pivotally mounted on said two hanger devices, respectively, the arms of each pair having one end thereof pivotally mounted on the respective hanger device for vertical swinging movement about horizontal axes parallel to the first-mentioned axis, said axes being horizontally spaced on opposite sides of a vertical line passing through the pivot axis of the respective walking beam, the last-named arms extending oppositely in longitudinal alignment from the hanger device and parallel to the respective walking beam whereby one arm extends forwardly and the other arm extends rearwardly, each pair of arms being disposed beneath and spaced from the respective walking beam; the two pairs of arms being aligned transversely of said frame, a rear axle mounted on the rear ends of the two rear arms, a front axle mounted on the front ends of said front arms, four bodies of resilient deformable microcellular material interposed between said walking beams and the respective radius arms, two of said bodies being disposed between the front ends of said radius arms and the front ends of the respective walking beams in load-bearing relation, the remaining two of said bodies being disposed between the rear ends of said radius arms and the rear ends of the respective walking beams in load-bearing relation, rebound means interconnecting the opposite ends of the walking beams to the front and rear ends of the respective arms for limiting separation movement therebetween, means associated with said hanger devices and axles for resisting braking and drive torque and for controlling relative lateral movement between said axles and said frame; the material of said bodies being a blown urethane elastomer of a density of about fifteen to thirty pounds per cubic foot, said materials including a multiplicity of microminiature compressible cells which render the body resiliently compressible, each said body having a thickness between the respective walking beam and radius arm which supports a predetermined load that partially but not fully compresses said cells thereby providing cells capable of further compression for supporting resiliently a load in addition to said predetermined load; means for locating and holding each body in position between the respective arm and beam, and means for limiting movement of said arms toward the respective beam.

3. A tandem suspension for vehicles comprising a vehicle frame having a longitudinal axis, two hanger devices fixedly secured to said frame and depending therefrom, said hanger devices being aligned transversely of said frame, two walking beams pivotally mounted intermediate the ends thereof on said hanger devices, respectively, for vertical swinging movement about a horizontal axis, said beams extending parallel to the longitudinal axis of said frame, four radius arms arranged in two pairs pivotally mounted on said two hanger devices, respectively, the arms of each pair having one end thereof pivotally mounted on the respective hanger device for vertical swinging movement about horizontal axes parallel to the first-mentioned axis, the last-named arms extending oppositely in from the hanger device whereby one arm extends forwardly and the other arm extends rearwardly, each pair of arms being disposed beneath and spaced from the respective walking beam; the two pairs of arms being aligned transversely of said frame, a rear axle mounted on the rear ends of the two rear arms, a front axle mounted on the front ends of said front arms, four bodies of resilient deformable and compressible microcellular material interposed between said walking beams and the respective radius arms, two of said bodies being disposed between the front ends of said radius arms and the front ends of the respective walking beams in load-bearing relation, the remaining two of said bodies being disposed between the rear ends of said radius arms and the rear ends of the respective walking beams in load-bearing relation, rebound means interconnecting the opposite ends of the walking beams to the front and rear ends of the respective arms for limiting separation movement therebetween, means associated with said hanger devices and axles for resisting braking and drive torque and for controlling relative lateral movement between said axles and said frame; the material of said bodies being a blown urethane elastomer of a density of about fifteen to thirty pounds per cubic foot, said materials including a multiplicity of microminiature compressible cells which render the body resiliently compressible, each said body having a thickness between the respective walking beam and radius arm which supports a predetermined load that partially but not fully compresses said cells thereby providing cells capable of further compression for supporting resiliently a load in addition to said predetermined load; each body having at least one hole therethrough which extends between the upper and lower surfaces thereof, each said radius arm having an upwardly projecting overload member which fits and projects into the hole of the respective body; each walking beam having on each end thereof a depending overload member which fits and projects into the hole of the respective body, the overload members in each hole being normally spaced apart a predetermined distance and engageable when the respective body is compressed by a predetermined amount.

4. A tandem suspension for vehicles comprising a vehicle frame having a longitudinal axis, two hanger devices fixedly secured to said frame and depending therefrom, said hanger devices being aligned transversely of said frame, two walking beams pivotally mounted intermediate the ends thereof on said hanger devices, respectively, for vertical swinging movement about a horizontal axis, said beams extending parallel to the longitudinal axis of said frame, four radius arms arranged in two pairs pivotally mounted on said two hanger devices, respectively, the arms of each pair having one end thereof pivotally mounted on the respective hanger device for vertical swinging movement about horizontal axes parallel to the first-mentioned axis, the last-named arms extending oppositely in from the hanger device whereby one arm extends forwardly and the other arm extends rearwardly, each pair of arms being disposed beneath and spaced from the respective walking beam; the two pairs of arms being aligned transversely of said frame, a rear axle mounted on the rear ends of the two rear arms ,a front axle mounted on the front ends of said front arms, four bodies of resilient deformable and compressible microcellular material interposed between said walking beams and the respective radius arms, two of said bodies being disposed between the front ends of said radius arms and the front ends of the respective walking beams in load-bearing relation, the remaining two of said bodies being disposed between the rear ends of said radius arms and the rear ends of the respective walking beams in load-bearing relation, rebound means interconnecting the opposite ends of the walking beams to the front and rear ends of the respective arms for limiting separation movement therebetween, means associated with said hanger devices and axles for resisting braking and drive torque and for controlling relative lateral movement between said axles and said frame; the material of said bodies being a blown urethane elastomer, said materials including a multiplicity of microminiature compressible cells which render the body resiliently compressible, each said body having a thickness between the respective walking beam and radius arm which supports a predetermined load that partially but not fully compresses said cells thereby providing cells capable of further compression for supporting resiliently a load in addition to said predetermined load; and means fitting into the interior of each said body for locating and holding the body in position between the respective arm and beam, space being provided about the periphery of each body for receiving horizontal deformation thereof.

5. A tandem suspension for vehicles comprising a vehicle frame having a longitudinal axis, two hanger devices fixedly secured to said frame and depending therefrom, said hanger devices being aligned transversely of said frame, two walking beams pivotally mounted intermediate the ends thereof on said hanger devices, respectively, for vertical swinging movement about a horizontal axis, said beams extending parallel to the longitudinal axis of said frame, four radius arms arranged in two pairs, means pivotally mounting said radius arms on said frame for vertical swinging movement, the last-named arms extending substantially parallel to said longitudinal axis, each pair of arms being disposed beneath and spaced from the respective walking beam; the two pairs of arms being aligned transversely of said frame, a rear axle mounted on the two rear arms, a front axle mounted on the front arms, four bodies of resilient deformable and compressible microcellular material interposed between said walking beams and the respective radius arms, two of said bodies being disposed between the front radius arms and the front ends of the respective walking beams in load-bearing relation, the remaining two of said bodies being disposed between the rear radius arms and the rear ends of the respective walking beams in load-bearing relation, rebound means interconnecting the opposite ends of the walking beams to the front and rear arms respectively for limiting separation movement therebetween, means associated with said hanger devices and axles for resisting braking and drive torque and for controlling relative lateral movement between said axles and said frame; the material of said bodies being a blown urethane elastomer, said material including a multiplicity of microminiature compressible cells which render the body resiliently compressible, each said body having a thickness between the respective walking beam and radius arm which supports a predetermined load that partially but not fully compresses said cells thereby providing cells capable of further compression for supporting resiliently a load in addition to said predetermined load.

References Cited

UNITED STATES PATENTS 3,231,256  1/1966  Olson _____ 267—63 X
3,241,856  3/1966  Raidel.

BENJAMIN HERSH, *Primary Examiner.*

P. GOODMAN, *Assistant Examiner.*

UNITED STATES PATENT OFFICE
CERTIFICATE OF CORRECTION

Patent No. 3,323,811                                     June 6, 1967

John M. Nelson

It is hereby certified that error appears in the above numbered patent requiring correction and that the said Letters Patent should read as corrected below.

Column 3, line 64, for "housing" read -- housings --; column 4, line 66, for "fltted" read -- fitted --; column 5, line 33, for "urethan" read -- urethane --; column 6, line 59, for "32" read -- 36 --; column 7, line 15, for "restoratative" read -- restorative --.

Signed and sealed this 25th day of June 1968.

(SEAL)
Attest:

Edward M. Fletcher, Jr.                               EDWARD J. BRENNER

Attesting Officer                                            Commissioner of Patents